(12) United States Patent
Karjalainen et al.

(10) Patent No.: US 12,063,091 B2
(45) Date of Patent: Aug. 13, 2024

(54) BEAM RANKING FOR POSITIONING

(71) Applicant: NOKIA TECHNOLOGIES OY, Espoo (FI)

(72) Inventors: Juha Pekka Karjalainen, Oulu (FI); Timo Koskela, Oulu (FI); Sami-Jukka Hakola, Kempele (FI); Jari Yrjänä Hulkkonen, Oulu (FI); Dileep Kumar, Oulu (FI); Italo Atzeni, Oulu (FI); Carlos Morais de Lima, Oulu (FI); Antti Tolli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 380 days.

(21) Appl. No.: 17/753,008

(22) PCT Filed: Aug. 23, 2019

(86) PCT No.: PCT/EP2019/072634
§ 371 (c)(1),
(2) Date: Feb. 16, 2022

(87) PCT Pub. No.: WO2021/037331
PCT Pub. Date: Mar. 4, 2021

(65) Prior Publication Data
US 2022/0345194 A1 Oct. 27, 2022

(51) Int. Cl.
*H04L 5/00* (2006.01)
*H04B 7/06* (2006.01)

(52) U.S. Cl.
CPC ......... *H04B 7/0695* (2013.01); *H04L 5/0053* (2013.01); *H04L 5/006* (2013.01)

(58) Field of Classification Search
CPC ..... H04B 7/0695; H04L 5/0053; H04L 5/006; H04L 5/0058
See application file for complete search history.

(56) References Cited

U.S. PATENT DOCUMENTS

| | | | |
|---|---|---|---|
| 10,979,128 B1 * | 4/2021 | Babaei | H04W 52/36 |
| 2019/0075563 A1 * | 3/2019 | Babaei | H04L 5/0094 |

(Continued)

OTHER PUBLICATIONS

3GPP TSG RAN WG1 Meeting#96bis, R1-1904321 Title: UE and gNB Measuemrnts for NR positioning (Year: 2019).*

(Continued)

*Primary Examiner* — Faruk Hamza
*Assistant Examiner* — Abusayeed M Haque
(74) *Attorney, Agent, or Firm* — Robert P. Michal, Esq.; Carter Deluca

(57) ABSTRACT

Devices, methods and computer program products for beam ranking for positioning purposes are disclosed. A network node device transmits to a client device a beam ranking indication comprising beam specific first reference data and beam ranking criteria for positioning for downlink transmission beams between the network node device and the client device. In response to a received downlink transmission beam selection indication indicating a downlink transmission beam selected by the client device based on the transmitted beam ranking indication, the network node device transmits second reference data to the client device with at least one downlink transmission beam according to the received downlink transmission beam selection indication.

16 Claims, 5 Drawing Sheets

(56) References Cited

U.S. PATENT DOCUMENTS

| | | | | |
|---|---|---|---|---|
| 2020/0092685 A1* | 3/2020 | Fehrenbach | .......... | H04W 76/14 |
| 2021/0014711 A1* | 1/2021 | Miao | ...................... | H04B 17/24 |
| 2021/0014900 A1* | 1/2021 | Lei | ........................ | H04W 52/42 |
| 2021/0135714 A1* | 5/2021 | Pezeshki | .............. | H04B 7/0695 |
| 2021/0211981 A1* | 7/2021 | Greenberger | ..... | H04W 52/0225 |

OTHER PUBLICATIONS

3GPP TSG-RAN WG23102, Tdoc R2-1806793 Title: Speed based cell re-selection parameter scaling (Year: 2018).*

3GPP TSG-RAN WG2 Meeting#103, R2-1811173 Title: Cell ranking for LTE-to-NR Cell Reselection (Year: 2018).*

International Search Report and Written Opinion for International Application No. PCT/EP2019/072634, mailed on May 13, 2020, 15 pages.

3GPP TSG RAN WG1 #97, R1-1906909; "Discussion on UE and GNB Measurements for NR Positioning"; Reno, Nevada, USA; Agenda Item: 7.2.10.3; Source: Samsung; May 13-17, 2019; 9 pages.

3GPP TSG RAN WG1 Meeting #96bis, R1-1904321; "UE and GNB Measurements for NR Positioning"; Ki'an, China; Source: Intel Corporation; Agenda Item: 7.2.10.2; Apr. 8-12, 2019; 9 pages.

3GPP TSG RAN WG1 #96bis, R1-1905264; "Views on Physical Layer Procedures for NR Positioning"; Xi'an, China; Agenda Item: 7.2.10.3; Source: Nokia, Nokia Shanghai Bell; Apr. 8-12, 2019; 6 pages.

* cited by examiner

BEAM RANKING FOR POSITIONING

CROSS-REFERENCE TO RELATED APPLICATIONS

This application is a national stage entry of International Application No. PCT/EP2019/072634, filed Aug. 23, 2019, entitled "BEAM RANKING FOR POSITIONING" which is hereby incorporated by reference in its entirety.

TECHNICAL FIELD

The disclosure relates to modern wireless communication devices and networks. The disclosure relates particularly to networks using beams.

BACKGROUND

Downlink (DL) positioning may be used in advanced wireless networks, such as third generation (3G) and fourth generation (4G) wireless networks. Positioning information can be requested by and/or reported to a client device or user equipment (UE) or the network. Control plane and signalling strategies have been specified to exchange the positioning information between the UE and the network.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises at least one processor and at least one memory including computer program code. The at least one memory and the computer program code are configured to, with the at least one processor, cause the network node device to at least perform:
  transmitting a beam ranking indication to a client device, the beam ranking indication comprising at least beam specific first reference data and beam ranking criteria for positioning for downlink transmission beams between the network node device and the client device; and
  in response to a received downlink transmission beam selection indication indicating at least one downlink transmission beam selected by the client device based on the transmitted beam ranking indication, transmitting second reference data to the client device with at least one downlink transmission beam according to the received downlink transmission beam selection indication.

In an example embodiment, alternatively or in addition to the above-described example embodiments, the at least one memory and the computer program code are further configured to, with the at least one processor, cause the network node device to at least perform:
  in response to a triggering event, determining a need to change beam ranking for the downlink transmission beams between the network node device and the client device.

In an example embodiment, alternatively or in addition to the above-described example embodiments, the triggering event comprises identifying a new synchronization signal block/channel state information reference signal (CSI-RS) or a downlink reference signal with spatial separation above a threshold level.

In an example embodiment, alternatively or in addition to the above-described example embodiments, the threshold level comprises a threshold level for transmission of an uplink reference signal for positioning.

In an example embodiment, alternatively or in addition to the above-described example embodiments, the identifying of the new synchronization signal block/channel state information reference signal (CSI-RS) or the downlink reference signal comprises identifying the new synchronization signal block/channel state information reference signal (CSI-RS) or the downlink reference signal based on at least one of time of flight, received reference signal power, or spatial separation.

In an example embodiment, alternatively or in addition to the above-described example embodiments, the triggering event comprises identifying a new synchronization signal block/channel state information reference signal (CSI-RS) or a downlink reference signal with at least one of time of flight, received reference signal power, or spatial separation for transmission of an uplink reference signal for positioning.

In an example embodiment, alternatively or in addition to the above-described example embodiments, the at least one memory and the computer program code are further configured to, with the at least one processor, cause the network node device to at least perform:
  in response to a received signal quality estimation indication indicating a signal quality of the transmitted second reference data estimated by the client device, estimating the position of the client device.

In an example embodiment, alternatively or in addition to the above-described example embodiments, the beam specific first reference data comprises at least one of a synchronization signal block with a unique index or a positioning reference signal with a unique index.

In an example embodiment, alternatively or in addition to the above-described example embodiments, the beam ranking indication is transmitted periodically, semi-persistently or aperiodically.

In an example embodiment, alternatively or in addition to the above-described example embodiments, the beam ranking criteria for positioning is based on at least one of: received signal information of the downlink transmission beams, angular information of the downlink transmission beams, time information of the downlink transmission beams, velocity information of movement of the client device, direction information of the movement of the client device, or a service requirement of the client device.

In an example embodiment, alternatively or in addition to the above-described example embodiments, the downlink transmission beam selection indication comprises at least one of a beam index of each selected downlink transmission beam, a resource identifier or a resource set identifier associated with each selected downlink transmission beam.

In an example embodiment, alternatively or in addition to the above-described example embodiments, the downlink transmission beam selection indication comprises a transmission power boosting request for a subset of the selected downlink transmission beams.

In an example embodiment, alternatively or in addition to the above-described example embodiments, the at least one memory and the computer program code are further configured to, with the at least one processor, cause the network node device to at least perform:

transmission power boosting the requested subset of the selected downlink transmission beams when transmitting the second reference data to the client device, In an example embodiment, alternatively or in addition to the above-described example embodiments, the second reference data is transmitted to the client device with a subset of the selected downlink transmission beams.

In an example embodiment, alternatively or in addition to the above-described example embodiments, the subset of the downlink transmission beams is selected based on at least one of local information at the network node device or network-provided information.

In an example embodiment, alternatively or in addition to the above-described example embodiments, the second reference data comprises at least one positioning reference signal.

An example embodiment of a network node device comprises means for performing:
transmitting a beam ranking indication to a client device, the beam ranking indication comprising at least beam specific first reference data and beam ranking criteria for positioning for downlink transmission beams between the network node device and the client device; and
in response to a received downlink transmission beam selection indication indicating at least one downlink transmission beam selected by the client device based on the transmitted beam ranking indication, transmitting second reference data to the client device with at least one downlink transmission beam according to the received downlink transmission beam selection indication.

An example embodiment of a method comprises:
transmitting, by a network node device, a beam ranking indication to a client device, the beam ranking indication comprising at least beam specific first reference data and beam ranking criteria for positioning for downlink transmission beams between the network node device and the client device; and
in response to a received downlink transmission beam selection indication indicating at least one downlink transmission beam selected by the client device based on the transmitted beam ranking indication, transmitting, by the network node device, second reference data to the client device with at least one downlink transmission beam according to the received downlink transmission beam selection indication.

In an example embodiment, alternatively or in addition to the above-described example embodiments, the method further comprises:
in response to a triggering event, determining, by the network node device, a need to change beam ranking for the downlink transmission beams between the network node device and the client device.

In an example embodiment, alternatively or in addition to the above-described example embodiments, the triggering event comprises identifying a new synchronization signal block/channel state information reference signal (CSI-RS) or a downlink reference signal with spatial separation above a threshold level.

In an example embodiment, alternatively or in addition to the above-described example embodiments, the threshold level comprises a threshold level for transmission of an uplink reference signal for positioning.

In an example embodiment, alternatively or in addition to the above-described example embodiments, the identifying of the new synchronization signal block/channel state information reference signal (CSI-RS) or the downlink reference signal comprises identifying the new synchronization signal block/channel state information reference signal (CSI-RS) or the downlink reference signal based on at least one of time of flight, received reference signal power, or spatial separation.

In an example embodiment, alternatively or in addition to the above-described example embodiments, the triggering event comprises identifying a new synchronization signal block/channel state information reference signal (CSI-RS) or a downlink reference signal with at least one of time of flight, received reference signal power, or spatial separation for transmission of an uplink reference signal for positioning.

In an example embodiment, alternatively or in addition to the above-described example embodiments, the method further comprises:
in response to a received signal quality estimation indication indicating a signal quality of the transmitted second reference data estimated by the client device, estimating, by the network node device, the position of the client device.

In an example embodiment, alternatively or in addition to the above-described example embodiments, the beam specific first reference data comprises at least one of a synchronization signal block with a unique index or a positioning reference signal with a unique index.

In an example embodiment, alternatively or in addition to the above-described example embodiments, the beam ranking indication is transmitted periodically, semi-persistently or aperiodically.

In an example embodiment, alternatively or in addition to the above-described example embodiments, the beam ranking criteria for positioning is based on at least one of: received signal information of the downlink transmission beams, angular information of the downlink transmission beams, time information of the downlink transmission beams, velocity information of movement of the client device, direction information of the movement of the client device, or a service requirement of the client device.

In an example embodiment, alternatively or in addition to the above-described example embodiments, the downlink transmission beam selection indication comprises at least one of a beam index of each selected downlink transmission beam, a resource identifier or a resource set identifier associated with each selected downlink transmission beam.

In an example embodiment, alternatively or in addition to the above-described example embodiments, the downlink transmission beam selection indication comprises a transmission power boosting request for a subset of the selected downlink transmission beams.

In an example embodiment, alternatively or in addition to the above-described example embodiments, the at least one memory and the computer program code are further configured to, with the at least one processor, cause the network node device to at least perform:
transmission power boosting the requested subset of the selected downlink transmission beams when transmitting the second reference data to the client device.

In an example embodiment, alternatively or in addition to the above-described example embodiments, the second reference data is transmitted to the client device with a subset of the selected downlink transmission beams.

In an example embodiment, alternatively or in addition to the above-described example embodiments, the subset of the downlink transmission beams is selected based on at least one of local information at the network node device or network-provided information.

In an example embodiment, alternatively or in addition to the above-described example embodiments, the second reference data comprises at least one positioning reference signal.

An example embodiment of a computer program product comprises program code configured to perform the method according to any of the above network node device related example embodiments, when the computer program product is executed on a computer.

An example embodiment of a client device comprises at least one processor and at least one memory including computer program code. The at least one memory and the computer program code are configured to, with the at least one processor, cause the client device to at least perform:
  in response to a received beam ranking indication comprising at least beam specific first reference data and beam ranking criteria for positioning for downlink transmission beams between a network node device and the client device, ranking the downlink transmission beams based on the received beam ranking indication;
  selecting at least one downlink transmission beam based on the ranking;
  transmitting a downlink transmission beam selection indication to the network node device indicating the selected at least one downlink transmission beam;
  in response to second reference data received from the network node device with at least one downlink transmission beam according to the transmitted downlink transmission beam selection indication, estimating the signal quality of the received second reference data; and
  transmitting a signal quality estimation indication to the network node device indicating the estimated signal quality of the received second reference data.

In an example embodiment, alternatively or in addition to the above-described example embodiments, the at least one memory and the computer program code are further configured to, with the at least one processor, cause the client device to at least perform:
  in response to a triggering event, determining a need to change beam ranking for downlink transmission beams between the network node device and the client device, In an example embodiment, alternatively or in addition to the above-described example embodiments, the triggering event comprises identifying a new synchronization signal block/channel state information reference signal (CSI-RS) or a downlink reference signal with spatial separation above a threshold level.

In an example embodiment, alternatively or in addition to the above-described example embodiments, the threshold level comprises a threshold level for transmission of an uplink reference signal for positioning.

In an example embodiment, alternatively or in addition to the above-described example embodiments, the identifying of the new synchronization signal block/channel state information reference signal (CSI-RS) or the downlink reference signal comprises identifying the new synchronization signal block/channel state information reference signal (CSI-RS) or the downlink reference signal based on at least one of time of flight, received reference signal power, or spatial separation.

In an example embodiment, alternatively or in addition to the above-described example embodiments, the triggering event comprises identifying a new synchronization signal block/channel state information reference signal (CSI-RS) or a downlink reference signal with at least one of time of flight, received reference signal power, or spatial separation for transmission of an uplink reference signal for positioning.

In an example embodiment, alternatively or in addition to the above-described example embodiments, the determination of the need to change beam ranking is based on at least one of: a service requirement by the client device, an identification of beams resolvable by the client device, or an indication from a network to change beam ranking.

In an example embodiment, alternatively or in addition to the above-described example embodiments, the beam specific first reference data comprises at least one of a synchronization signal block with a unique index or a positioning reference signal with a unique index.

In an example embodiment, alternatively or in addition to the above-described example embodiments, the beam ranking indication is received periodically, semi-persistently or aperiodically.

In an example embodiment, alternatively or in addition to the above-described example embodiments, the beam ranking criteria for positioning is based on at least one of: received signal information of the downlink transmission beams, angular information of the downlink transmission beams, time information of the downlink transmission beams, velocity information of movement of the client device, direction information of the movement of the client device, or a service requirement of the client device.

In an example embodiment, alternatively or in addition to the above-described example embodiments, the ranking of the downlink transmission beams comprises at least one of a hierarchic ranking or a weighted ranking.

In an example embodiment, alternatively or in addition to the above-described example embodiments, the downlink transmission beam selection indication comprises at least one of a beam index of each selected downlink transmission beam, a resource identifier or a resource set identifier associated with each selected downlink transmission beam.

In an example embodiment, alternatively or in addition to the above-described example embodiments, the downlink transmission beam selection indication comprises a transmission power boosting request for a subset of the selected downlink transmission beams.

In an example embodiment, alternatively or in addition to the above-described example embodiments, the subset of the downlink transmission beams is selected based on at least one of local information at the client device or network-provided information.

In an example embodiment, alternatively or in addition to the above-described example embodiments, the second reference data comprises at least one positioning reference signal.

An example embodiment of a client device comprises means for performing:
  in response to a received beam ranking indication comprising at least beam specific first reference data and beam ranking criteria for positioning for downlink transmission beams between a network node device and the client device, ranking the downlink transmission beams based on the received beam ranking indication;
  selecting at least one downlink transmission beam based on the ranking;
  transmitting a downlink transmission beam selection indication to the network node device indicating the selected at least one downlink transmission beam;

in response to second reference data received from the network node device with at least one downlink transmission beam according to the transmitted downlink transmission beam selection indication, estimating the signal quality of the received second reference data; and transmitting a signal quality estimation indication to the network node device indicating the estimated signal quality of the received second reference data.

An example embodiment of a method comprises:

in response to a received beam ranking indication comprising at least beam specific first reference data and beam ranking criteria for positioning for downlink transmission beams between a network node device and a client device, ranking, by the client device, the downlink transmission beams based on the received beam ranking indication;

selecting, by the client device, at least one downlink transmission beam based on the ranking;

transmitting, by the client device, a downlink transmission beam selection indication to the network node device indicating the selected at least one downlink transmission beam;

in response to second reference data received from the network node device with at least one downlink transmission beam according to the transmitted downlink transmission beam selection indication, estimating, by the client device, the signal quality of the received second reference data; and transmitting, by the client device, a signal quality estimation indication to the network node device indicating the estimated signal quality of the received second reference data.

In an example embodiment, alternatively or in addition to the above-described example embodiments, the method further comprises: in response to a triggering event, determining, by the client device, a need to change beam ranking for downlink transmission beams between the network node device and the client device.

In an example embodiment, alternatively or in addition to the above-described example embodiments, the triggering event comprises identifying a new synchronization signal block/channel state information reference signal (CSI-RS) or a downlink reference signal with spatial separation above a threshold level.

In an example embodiment, alternatively or in addition to the above-described example embodiments, the threshold level comprises a threshold level for transmission of an uplink reference signal for positioning.

In an example embodiment, alternatively or in addition to the above-described example embodiments, the identifying of the new synchronization signal block/channel state information reference signal (CSI-RS) or the downlink reference signal comprises identifying the new synchronization signal block/channel state information reference signal (CSI-RS) or the downlink reference signal based on at least one of time of flight, received reference signal power, or spatial separation.

In an example embodiment, alternatively or in addition to the above-described example embodiments, the triggering event comprises identifying a new synchronization signal block/channel state information reference signal (CSI-RS) or a downlink reference signal with at least one of time of flight, received reference signal power, or spatial separation for transmission of an uplink reference signal for positioning.

In an example embodiment, alternatively or in addition to the above-described example embodiments, the determination of the need to change beam ranking is based on at least one of: a service requirement by the client device, an identification of beams resolvable by the client device, or an indication from a network to change beam ranking.

In an example embodiment, alternatively or in addition to the above-described example embodiments, the beam specific first reference data comprises at least one of a synchronization signal block with a unique index or a positioning reference signal with a unique index.

In an example embodiment, alternatively or in addition to the above-described example embodiments, the beam ranking indication is received periodically, semi-persistently or aperiodically.

In an example embodiment, alternatively or in addition to the above-described example embodiments, the beam ranking criteria for positioning is based on at least one of: received signal information of the downlink transmission beams, angular information of the downlink transmission beams, time information of the downlink transmission beams, velocity information of movement of the client device, direction information of the movement of the client device, or a service requirement of the client device.

In an example embodiment, alternatively or in addition to the above-described example embodiments, the ranking of the downlink transmission beams comprises at least one of a hierarchic ranking or a weighted ranking.

In an example embodiment, alternatively or in addition to the above-described example embodiments, the downlink transmission beam selection indication comprises at least one of a beam index of each selected downlink transmission beam, a resource identifier or a resource set identifier associated with each selected downlink transmission beam.

In an example embodiment, alternatively or in addition to the above-described example embodiments, the downlink transmission beam selection indication comprises a transmission power boosting request for a subset of the selected downlink transmission beams.

In an example embodiment, alternatively or in addition to the above-described example embodiments, the subset of the downlink transmission beams is selected based on at least one of local information at the client device or network-provided information.

In an example embodiment, alternatively or in addition to the above-described example embodiments, the second reference data comprises at least one positioning reference signal.

An example embodiment of a computer program product comprises program code configured to perform the method according to any of the above client device related example embodiments, when the computer program product is executed on a computer.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
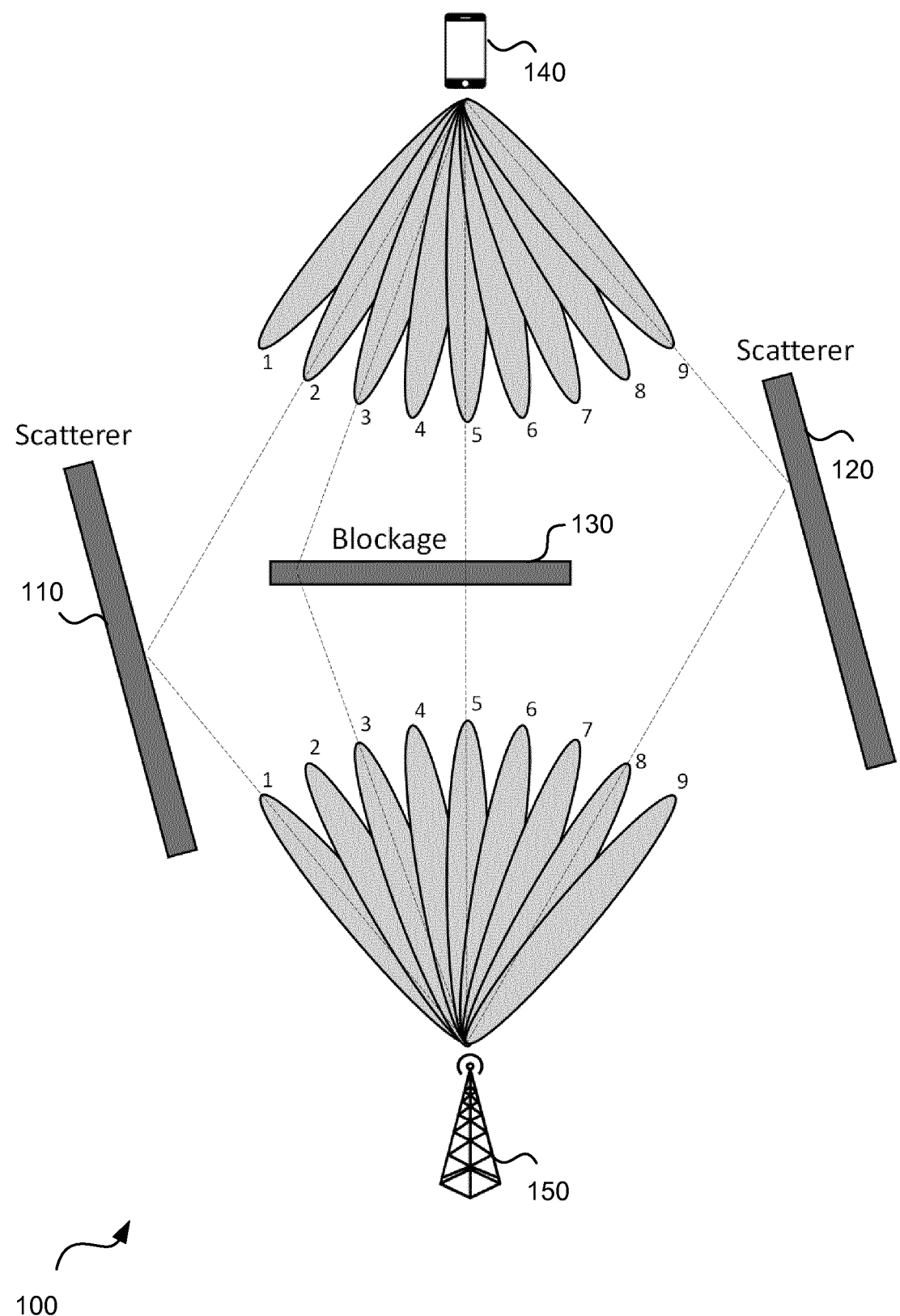
FIG. 1 shows an example embodiment of the subject matter described herein illustrating an example system, where various example embodiments of the present disclosure may be implemented.

FIG. 1 illustrates an example system 100, where various embodiments of the present disclosure may be implemented. The system 100 may comprise a fifth generation (5G) new radio (NR) network. An example representation of the system 100 is shown depicting a client device 140, a network node device 150, two objects 110, 120 that reflect radio beams, as well as an object 130 that obstructs radio beams. Herein, terms "beam" and "radio beam" are used to refer to radio beams suitable for communication and/or positioning.

The client device 140 may include e.g. a mobile phone, a smartphone, a tablet computer, a smart watch, or any handheld or portable device. The client device 140 may also be referred to as a user equipment (UE). The network node device 150 may be a base station. The base station may include e.g. a fifth-generation base station (gNB) or any such device suitable for providing an air interface for client devices to connect to a wireless network via wireless transmissions.

For both the client device 140 and the network node device 150, there are nine radio beams shown in the example embodiment of FIG. 1. Several beams and reflecting and obstructing objects 110-130 in the radio path contribute to multipath propagation of the radio waves between the client device 140 and the network node device 150.

The accuracy of downlink (DL) positioning may be degraded in the presence of multipath propagation. The strongest multipath component may not necessarily correspond to the shortest path relative to a surrounding transmitting cell—this happens, e.g. when the line-of-sight (LoS) direction is obstructed. When utilizing a conventional synchronization signal block (SSB) or non-zero power channel state information reference signal (NZP-CSI-RS) resource based beam management procedure, the UE 140 may only rank transmission (TX) beams based on their reference signal received power (RSRP) measurements. This limitation may inaccurately cause the UE 140 to select a DL TX beam direction with a high RSRP value that does not correspond to the shortest distance with the network node device 150 (e.g. a serving next generation NodeB (gNB)), thus degrading the accuracy of the positioning. Even though the accuracy of the positioning may theoretically be increased by having measurements from several spatial components, in practice DL TX beams that are close to each other in the spatial domain generally contribute very similar information for positioning. For example, SSBs corresponding to adjacent DL TX beams and selected only based on RSRP measurements may be spatially correlated, and thus may contribute only marginal improvements for the positioning accuracy.

Currently, NR minimum performance targets for positioning are <5 meters (m) for 80% of UEs and <3 m for 80% of the UEs in commercial use cases. Furthermore, it has been proposed that the next generation high accuracy positioning will require a level of accuracy less than 1 m in more than 95% of the service area.

Figure 2A:
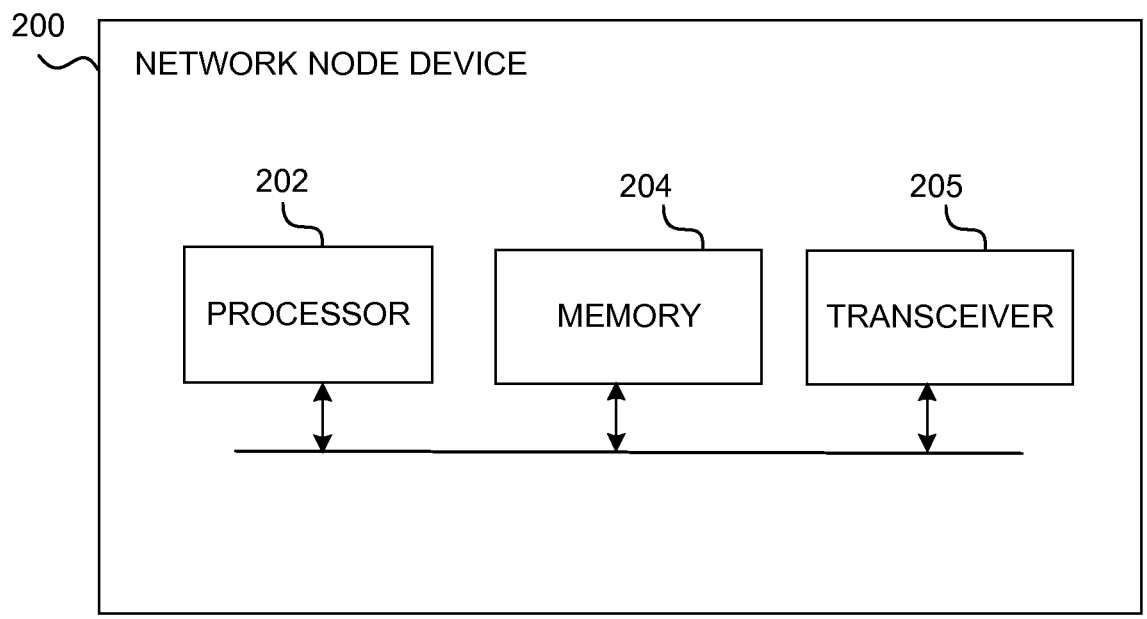
FIG. 2A shows an example embodiment of the subject matter described herein illustrating a network node device.

FIG. 2A is a block diagram of a network node device 200, in accordance with an example embodiment. As an example, the network node device 200 may comprise a network node device for wireless communication and/or positioning, such as a base station (or any such device suitable for providing an air interface for client devices to connect to a wireless network via wireless transmissions), such as a 5G base station. As an example, the network node device 200 may be a stationary one or a moving one (such as a drone base station).

The network node device 200 comprises one or more processors 202, and one or more memories 204 that comprise computer program code. The network node device 200 may also include a transceiver 205, as well as other elements, such as an input/output module (not shown in FIG. 2A), and/or a communication interface (not shown in FIG. 2A).

Although the network node device 200 is depicted to include only one processor 202, the network node device 200 may include more processors. In an embodiment, the memory 204 is capable of storing instructions, such as an operating system and/or various applications.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

In response to a triggering event, the at least one memory 204 and the computer program code may optionally be configured to, with the at least one processor 202, cause the network node device 200 to perform determining a need to change beam ranking for the downlink transmission beams between the network node device 200 and a client device 210. Alternatively, the network node device 200 may receive an indication transmitted by the client device 210 informing the network node device 200 about the need to change beam ranking for the downlink transmission beams between the network node device 200 and the client device 210, as discussed in further detail in connection with FIG. 2B.

For example, the triggering event may comprise identifying a new synchronization signal block/channel state information reference signal (CSI-RS) or any downlink reference signal with spatial separation above a threshold level. In another example, the triggering event may comprise identifying a new synchronization signal block/channel state information reference signal (CSI-RS) or any downlink reference signal based on at least one of the following: time of flight, received reference signal power, or spatial separation. An example of time flight includes the time difference between time of flights associated with any downlink reference signals (e.g. CSI-RS) or synchronization signal blocks. In other words, a triggering event may be defined for the client device 210-initiated reporting of DL TX beams upon detecting that predefined criteria are fulfilled. This may include identifying a new SSB/channel state information reference signal (CSI-RS) with spatial separation above a threshold level that is not currently a spatial source signal for PRS transmission or previously not included in the report. The threshold level may be signalled by the network, or it may be predefined, or it may be based on client device 210 implementation (network may enable/disable event triggering). The spatial separation may be evaluated per antenna panel, or it may be independent of client device 210 antenna panels. The threshold level may comprise a threshold level for transmission of an uplink reference signal for positioning. In an example embodiment, a device reports candidate downlink reference signals (e.g. SSB index, CSI RS resource indicator) as a spatial reference for the transmission of uplink reference signals for positioning (e.g. UL PRS). Based on the reported downlink reference signal information, the network may trigger/configure the transmission of an uplink reference signal for positioning. Alternatively, the network may configure the device to transmit an UL sounding reference signal (SRS) and determine a candidate SRS resource indicator (that identifies the transmitted SRS) for configuring an uplink PRS transmission for positioning.

The at least one memory 204 and the computer program code are configured to, with the at least one processor 202, cause the network node device 200 to perform transmitting a beam ranking indication to the client device 210 for wireless communication. The beam ranking indication comprises at least beam specific first reference data and beam ranking criteria for positioning for downlink transmission beams between the network node device 200 and the client device 210. The beam ranking indication may be transmitted periodically, semi-persistently, aperiodically, and/or in response to the determined (by the network node device 200 or the client device 210) need to change beam ranking for the downlink transmission beams between the network node device 200 and the client device 210.

In other words, the beam ranking indication may be used by the network node device 200 to indicate to the client device 210 to change the beam ranking method and conditions, selection and reporting according to a predefined set of ranking criteria, conditions and reporting ways. In an example, the beam ranking indication may be transmitted based on physical layer (e.g. downlink control information (DCI)), and/or medium access control (MAC) (e.g. a MAC control element), and/or radio resource control (RRC) level signalling.

For example, the beam specific first reference data may comprise a synchronization signal block (SSB) with a unique index and/or a positioning reference signal (PRS) with a unique index. In an example embodiment, a unique index of an SSB or a unique index of a PRS may comprise e.g. a resource identifier (ID) or resource set(s) and/or a sequence ID. The unique index may be unique across a set of transmission and reception points (TRP)s, or within a set of cells having the same or different physical cell IDs.

For example, the beam ranking criteria for positioning may be based on: received signal information (e.g. received reference signal power (RSPR) and/or received signal strength indicator (RSSI)) of the downlink transmission beams, angular information (e.g. departure of angle (DoA) in azimuth and/or elevation domains, angle of arrival (AoA) in azimuth and/or elevation domains) of the downlink transmission beams, time information (e.g. time of flight (ToF), and/or time difference with respect to timings associated with different resources/resource sets of different TRPs) of the downlink transmission beams, velocity information of movement of the client device, direction information of the movement of the client device, and/or a service requirement of the client device 210. In addition/alternatively, the beam ranking criteria for positioning may be based on the velocity information of movement of the network node device if the network node device 200 is a moving one (such as a drone base station).

In other words, the client device 210 assisted/event based ranking criteria may be based on physical layer information, such as:
  a. received signal information, i.e. prioritizing beam directions with higher RSRP;
  b. angular information, i.e. prioritizing beam directions with higher spatial separation associated with e.g. the AoA and/or the DoA at the client device 210-side;
  c. time information, i.e. prioritizing beam directions with shorter ToF;
  d. client device 210 velocity and/or known/predicted direction of movement, i.e. prioritizing beams in the direction in which the client device 210 is moving;
  e. any hierarchical selection and/or a weighted combination of the above options a. to d.

In response to a downlink transmission beam selection indication received from the client device 210 that indicates at least one downlink transmission beam that the client device 210 has selected based on the beam ranking indication that the network node device 200 transmitted to the client device 210, the at least one memory 204 and the computer program code are further configured to, with the at least one processor 202, cause the network node device 200 to perform transmitting second reference data to the client device 210 with at least one downlink transmission beam that is in accordance with the received downlink transmission beam selection indication. In an example, the second reference data may comprise at least one positioning reference signal (PRS).

For example, the downlink transmission beam selection indication may comprise a beam index of each selected downlink transmission beam, a resource identifier and/or a resource set identifier associated with each selected downlink transmission beam.

In an example, the second reference data may be transmitted to the client device 210 using a subset of the selected downlink transmission beams. For example, the subset of the downlink transmission beams may be selected based on local information available at the network node device 200 and/or network-provided information.

Additionally/alternatively, the downlink transmission beam selection indication may comprise an UE event-based transmission power boosting request for a subset of the selected downlink transmission beams for positioning. When the transmission power boosting request is included, the at least one memory 204 and the computer program code may optionally be further configured to, with the at least one processor 202, cause the network node device 200 to perform transmission power boosting the requested subset of the selected downlink transmission beams when transmitting the second reference data to the client device 210.

In other words, the network node device 200 may select a subset of beams from those previously reported by the client device 210 and/or the network node device 200 may boost the PRSs on a subset of low-quality beams before transmitting them to the client device 210. Such subset selection can be based on e.g. local information at the network node device 200 (e.g. based on intra-cell interference, and/or channel statistics, and/or client device 210 mobility); and/or network-aided information (e.g. based on inter-cell interference).

In yet other words, the network node device 200 may utilize a PRS transmission and transmission power boosting mechanism whereby the network node device 200 selects a suitable subset of spatial directions e.g. from the previously reported UE beams and/or e.g. based on prior statistical knowledge (e.g. previous physical layer measurement(s) such as received signal strength (RSS), ToF, geographical maps, and the like). Furthermore, the network node device 200 may decide whether to power boost some of these directions. For instance, such PRS transmission power boosting mechanism may be used to prioritize spatially separated and/or time separated and/or low-RSRP beams that provide uncorrelated information.

In response to a signal quality estimation indication received from the client device 210 that indicates a signal quality of the second reference data that the network node device 200 transmitted to the client device 210 as estimated by the client device 210, the at least one memory 204 and the computer program code may optionally be further configured to, with the at least one processor 202, cause the network node device 200 to perform estimating the position of the client device 210, e.g. based on measurement(s) reported by the client device 210, such as an observed time difference of arrival (OTDOA) or the like.

Figure 2B:
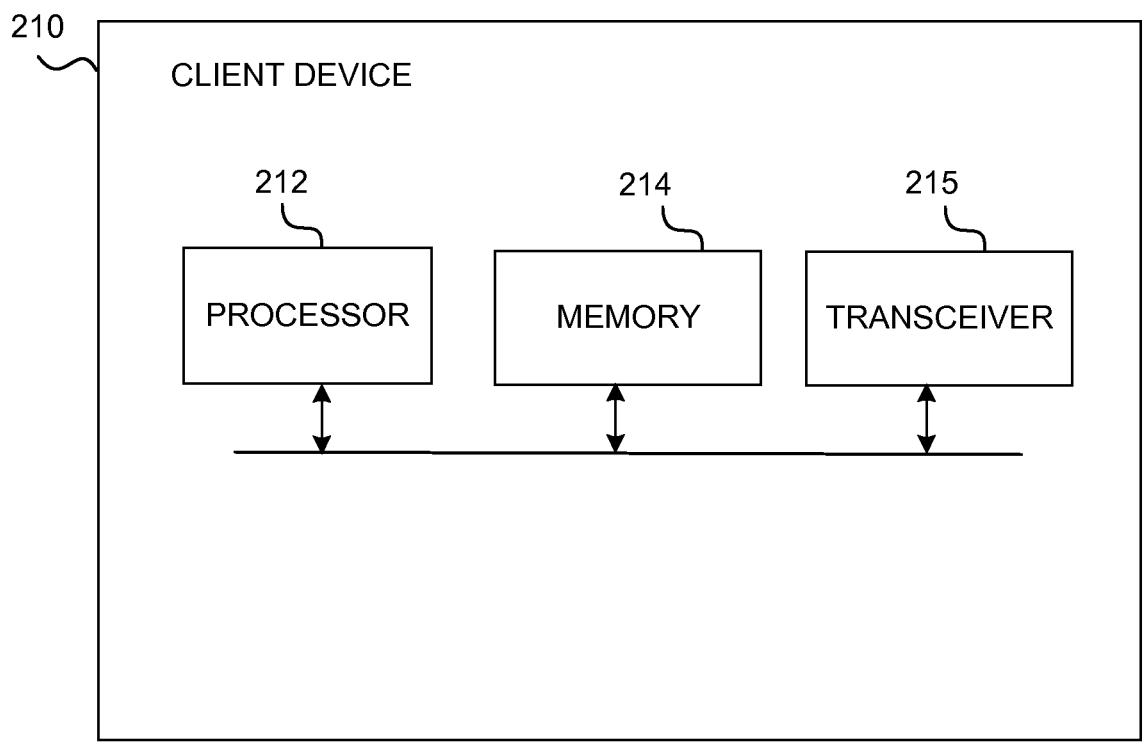
FIG. 2B shows an example embodiment of the subject matter described herein illustrating a client device.

FIG. 2B is a block diagram of the client device 210 for wireless communication, in accordance with an example embodiment. As an example, the client device 210 may comprise a client device for wireless communication and/or positioning, such as any of various types of devices used directly by an end user entity and capable of communication in a wireless network. Such devices include but are not limited to smartphones, tablet computers, smart watches, laptop computers, Internet-of-Things (IoT) devices, etc.

The client device 210 comprises one or more processors 212, and one or more memories 214 that comprise computer program code. The client device 210 may also include a transceiver 215, as well as other elements, such as an input/output module (not shown in FIG. 2B), and/or a communication interface (not shown in FIG. 2B).

Although the client device 210 is depicted to include only one processor 212, the client device 210 may include more processors. In an embodiment, the memory 214 is capable of storing instructions, such as an operating system and/or various applications.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

In response to a triggering event, the at least one memory 214 and the computer program code may optionally be configured to, with the at least one processor 212, cause the client device 210 to perform determining a need to change beam ranking for the downlink transmission beams between the network node device 200 and the client device 210. In such as a case, the at least one memory 214 and the computer program code may optionally be further configured to, with the at least one processor 212, cause the client device 210 to perform transmitting an indication to the network node device 200 informing the network node device 200 about the need to change beam ranking for the downlink transmission beams between the network node device 200 and the client device 210.

For example, the determination of the need to change beam ranking may be based on a service requirement by the client device 210, and/or on identification of beams resolvable by the client device 210 to improve positioning accuracy. Herein, "resolvable" means that the client device 210 is able to acquire meaningful information on that specific beam direction. For example, the determination of the need to change beam ranking may be based on the client device 210 detecting new DL reference signals, e.g. based on RSRP and/or time and/or angular information such as time of flight (ToF), AoA, and DoA.

In response to a beam ranking indication received from the network node device 200 that comprises at least beam specific first reference data and beam ranking criteria for positioning for downlink transmission beams between the network node device 200 and the client device 210, the at least one memory 214 and the computer program code are configured to, with the at least one processor 212, cause the client device 210 to perform ranking the downlink transmission beams based on the received beam ranking indication.

In other words, the client device 210 may utilize a beam ranking mechanism which ranks spatial directions according to predefined ranking criteria. For instance, such ranking criteria can be based on already employed physical layer information in time and angular domain in addition to RSRP-based information. Additional ranking criteria can include e.g. UE velocity, UE direction of movement, and/or UE service requirement.

For example, the ranking of the downlink transmission beams may comprise a hierarchic ranking and/or a weighted ranking.

In other words, the client device 210 may implement the beam ranking and selection mechanism e.g. in one of the following ways:
1. hierarchical ranking and selection according to a predefined sequence of criteria such that a subset of beams satisfying the first criterion and given minimum quality requirements is checked for the second criterion and so on, until all criteria are satisfied; and/or
2. ranking and selection based on a predefined weighted combination of criteria.

Figure 4:
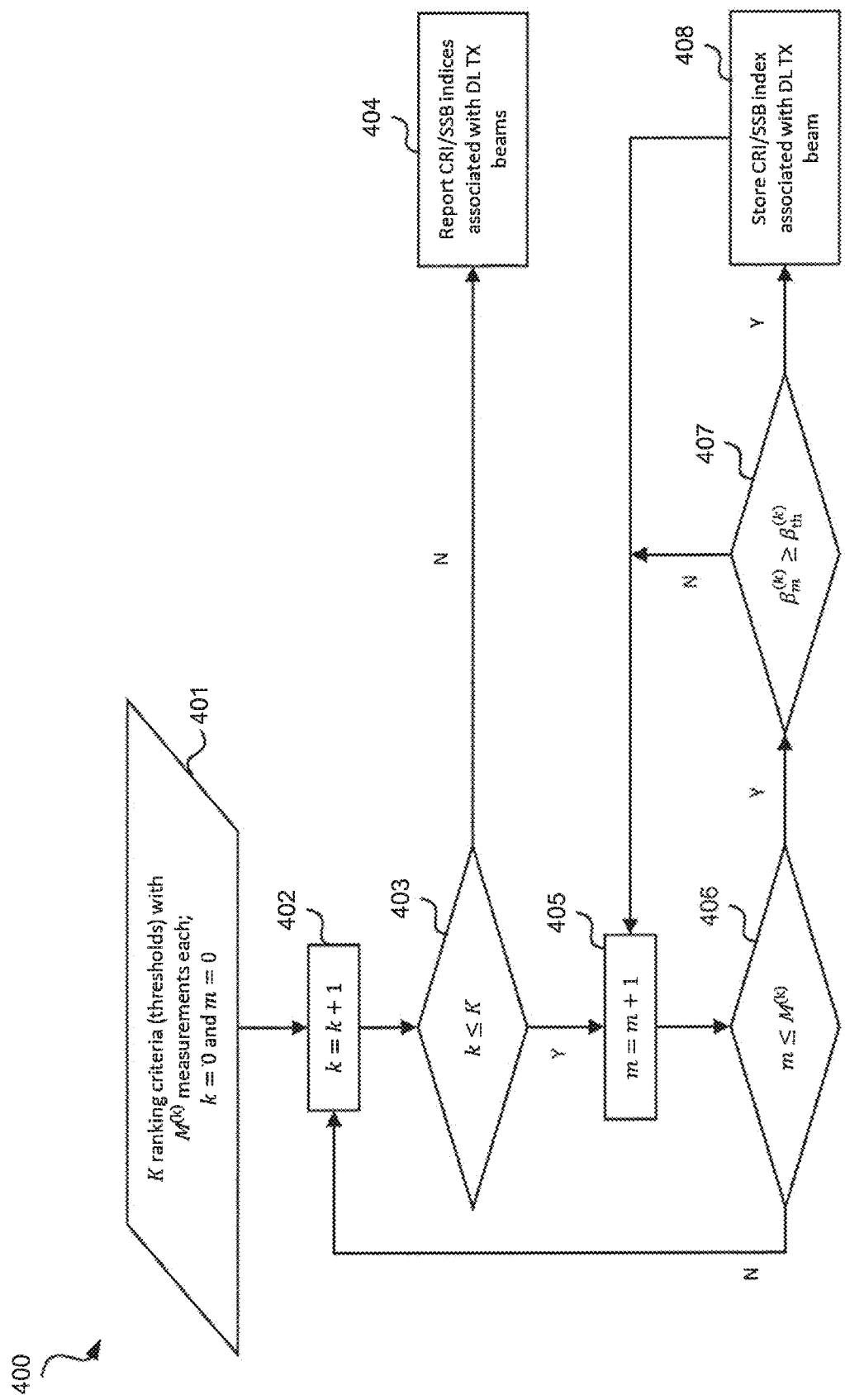
FIG. 4 shows an example embodiment of the subject matter described herein illustrating hierarchical ranking.

FIG. 4 shows an example embodiment of the subject matter described herein illustrating hierarchical ranking and selection.

Here, the network node device 200 indicates K ranking criteria with corresponding thresholds where the k th criterion involves $M^{(k)}$ measurements. $\beta_m^{(k)}$ and $\beta_{th}^{(k)}$ correspond to, respectively, the mth measurement and the threshold associated with the kth criterion. For instance, the first criterion may be angle separation between arriving receive beam directions (i.e. AoAs), the second criterion may be ToF, and the third criterion may be RSRP. When reporting the beam indices, the client device 210 may request transmission power boosting on a subset of beam directions on which the network node device 200 will subsequently send PRSs.

Thus, at operation 401, K ranking criteria (thresholds) with $M^{(k)}$ measurements each are determined, such that k=0 and m=0. At operation 402, k is incremented. At operation 403, it is checked whether k≤K. If not, the example embodiment proceeds to operation 404 in which CRI/SSB indices, or a PRS resource set or a resource indicator associated with DL TX beams are reported. If yes, the example embodiment proceeds to operation 405 in which m is incremented. At operation 406, it is checked whether m≤$M^{(k)}$. If not, the example embodiment returns to operation 402. If yes, the example embodiment proceeds to operation 407 in which it is checked whether $\beta_m^{(k)} \leq \beta_{th}^{(k)}$. If not, the example embodiment returns to operation 405. If yes, the example embodiment proceeds to operation 408 in which a CRI/SSB index, or a PRS resource set, or a resource indicator associated with DL TX beam is stored.

The at least one memory 214 and the computer program code are further configured to, with the at least one processor 212, cause the client device 210 to perform selecting at least one downlink transmission beam based on the performed ranking.

In other words, the client device 210 may utilize a beam selection mechanism which identifies at least one spatial direction associated with the angle of arrival (AoA), and/or angle of departure (DoA) at the client device 210 side determined by the network or by the client device 210.

The at least one memory 214 and the computer program code are further configured to, with the at least one processor 212, cause the client device 210 to perform transmitting a downlink transmission beam selection indication to the network node device 200 that indicates the selected at least one downlink transmission beam.

In other words, the client device 210 may utilize a beam reporting mechanism which reports at least one of the previously identified spatial directions.

For example, the downlink transmission beam selection indication may comprise a transmission power boosting request for a subset of the selected downlink transmission beams. Such a subset of the downlink transmission beams may be selected e.g. based on local information available at the client device 210 and/or network-provided information.

In other words, the client device 210 may request transmission power boosting on a subset of beam directions on which the network node device 200 will subsequently send PRSs. Such subset selection can be based on e.g. local information at the client device 210 (e.g. based on RSRP, and/or time information (e.g. Time of Flight), and/or angular information, and/or client device 210 mobility); and/or network-aided information (e.g. based on intra-/inter-cell interference).

In response to second reference data (such as one or more positioning reference signals (PRS), as discussed on connection with FIG. 2A) received from the network node device 200 with at least one downlink transmission beam that is in accordance with the transmitted downlink transmission beam selection indication, the at least one memory 214 and the computer program code are further configured to, with the at least one processor 212, cause the client device 210 to perform estimating the signal quality of the received second reference data.

The at least one memory 214 and the computer program code are further configured to, with the at least one processor 212, cause the client device 210 to perform transmitting a signal quality estimation indication to the network node device 200 that indicates the estimated signal quality of the received second reference data.

In other words, in an example embodiment, the network node device 200 may transmit SSBs/PRSs periodically/semi-persistently/aperiodically whereby each SSB/PRS resource is identified by a unique index and is transmitted in the corresponding DL TX beam direction. In addition, the network node device 200 transmits the beam ranking criteria for positioning to the client device 210. Then, according the ranking criteria, the client device 210 ranks, selects, and reports beam indices to the network node device 200. The network node device 200 transmits PRSs to the client device 210 using the beams previously reported by the client device 210, and in some embodiments applying a transmission power boosting mechanism to improve the estimation quality of some of the beams. The client device 210 estimates the quality of the received PRSs together with the time and angular information at the client device 210-side and reports this information back to the network node device 200. The network node device 200 estimates the client device 210 position using the information previously reported by the client device 210, which can be enhanced by considering the spatially separated beams in azimuth and/or elevation domains with less correlated information at the network node device 200-side.

Examples of specific criteria may include e.g. arriving receive beam directions (i.e., AoAs), time of flight, and/or RSRP. E.g., if the client device 210 needs to activate an additional antenna panel for PRS measurement, it may impact client device 210 scheduling availability. In an example, the reported set is fixed in size, e.g. N-best according to given criteria, i.e. the client device 210 determines that previously reported N-best has changed, or the client device 210 may indicate additional DL RS to already reported N-best.

As an example, if multiple DL TX beams satisfying the threshold are detected, the selection of specific beams may e.g. prioritize the highest spatial separation: this may provide higher flexibility for the network to determine which beams are used for PRS transmission based on the client device 210 report. In a similar manner, this procedure can be carried out using other suitable criteria.

Further features (such as those related to the beam ranking indication, the beam specific first reference data, the beam ranking criteria for positioning, the downlink transmission beam selection indication, the second reference data, etc.) of the client device 210 directly result from the functionalities and parameters of the network node device 200 and thus are not repeated here.

Figure 3:
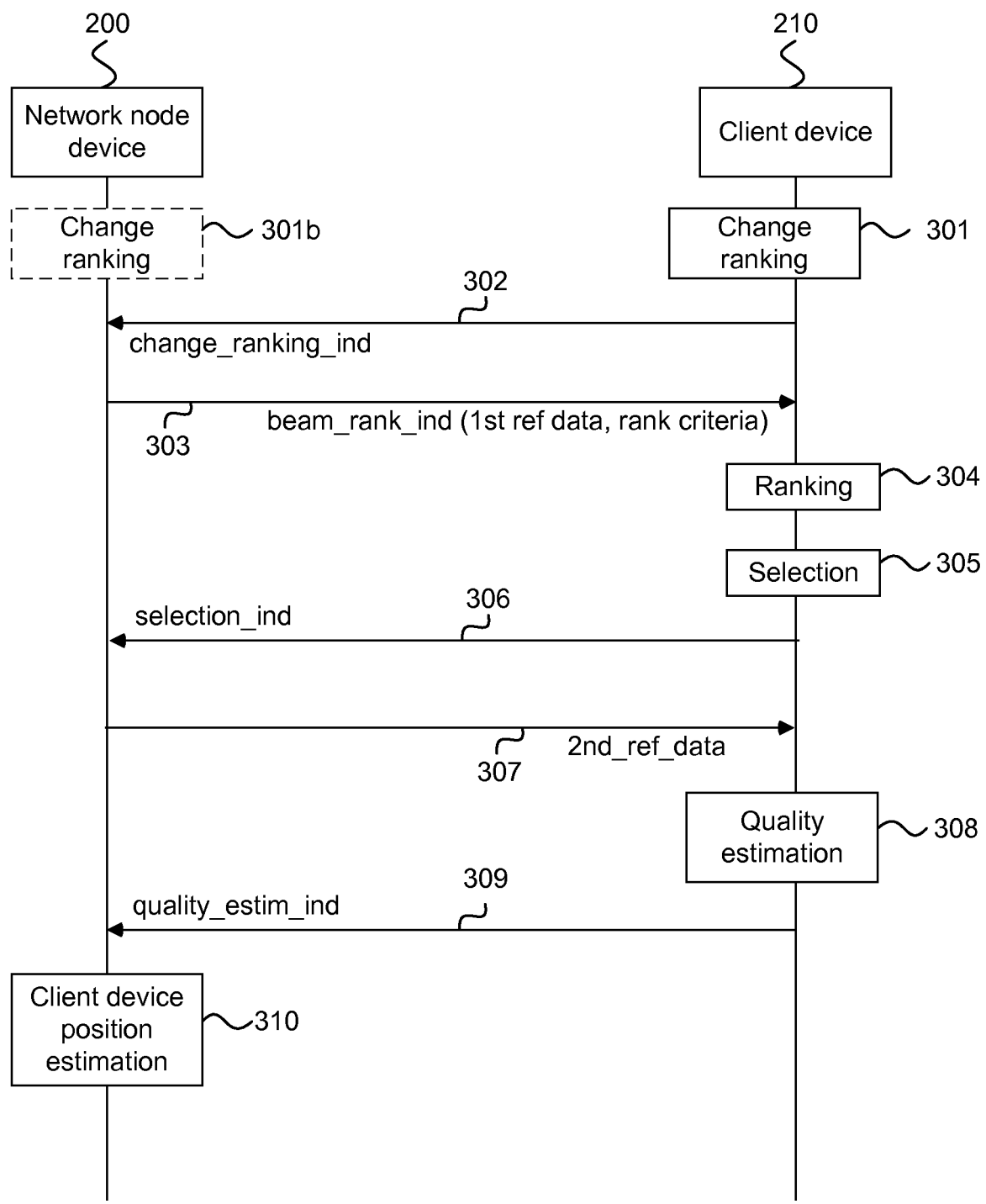
FIG. 3 shows an example embodiment of the subject matter described herein illustrating a method.

FIG. 3 illustrates an example signaling diagram of a method 300 of beam ranking for positioning, in accordance with an example embodiment.

In optional operation 301, the client device 210 may determine that there's a need to change beam ranking for downlink transmission beams between the network node device 200 and the client device 210. In such a case, the client device 210 may transmit an indication to the network node device 200 informing the network node device 200 about the need to change beam ranking for the downlink transmission beams between the network node device 200 and the client device 210, operation 302. Alternatively, in optional operation 301b, the network node device 200 may be the one that determines that there's a need to change beam ranking for the downlink transmission beams between the network node device 200 and the client device 210.

At operation 303, the network node device 200 transmits a beam ranking indication to the client device 210. The beam ranking indication comprises at least beam specific first reference data and beam ranking criteria for positioning for downlink transmission beams between the network node device 200 and the client device 210.

At operation 304, in response to the received beam ranking indication, the client device 210 ranks the downlink transmission beams based on the received beam ranking indication.

At operation 305, the client device 210 selects at least one downlink transmission beam based on the ranking of operation 304.

At operation 306, the client device 210 transmits a downlink transmission beam selection indication to the network node device 200 that indicates the selected at least one downlink transmission beam. As discussed in more detail above, the downlink transmission beam selection indication may further comprise a transmission power boosting request for a subset of the selected downlink transmission beams.

At operation 307, in response to the received downlink transmission beam selection indication, the network node device 200 transmits second reference data to the client device 210 with at least one downlink transmission beam that is in accordance with the downlink transmission beam selection indication received at operation 306. When the transmission power boosting request is included in operation 306, the network node device 200 may power boost the requested subset of the selected downlink transmission beams when transmitting the second reference data to the client device 210 at operation 307.

At operation 308, in response to the second reference data received from the network node device 200 at operation 307, the client device 210 estimates the signal quality of the received second reference data.

At operation 309, the client device 210 transmits a signal quality estimation indication to the network node device 200 that indicates the signal quality of the received second reference data as estimated at operation 308.

At optional operation 310, in response to the signal quality estimation indication received at operation 309, the network node device 200 estimates the position of the client device 210.

The method 300 may be performed by the network node device 200 of FIG. 2A and the client device 210 of FIG. 2B. Further features of the method 300 directly result from the functionalities and parameters of the network node device 200 and the client device 210 and thus are not repeated here. The method 300 can be performed by computer program(s).

Figure 5:
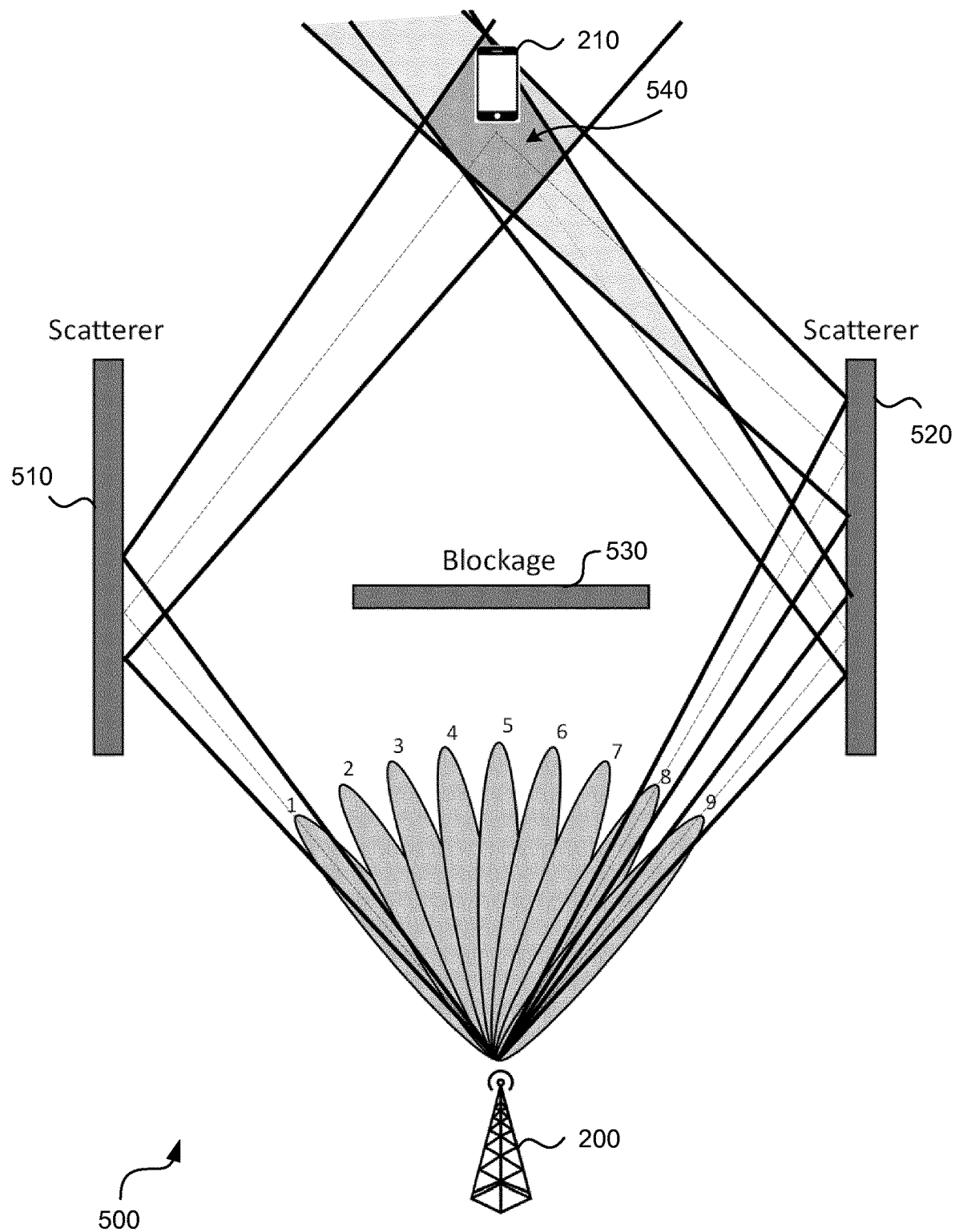
FIG. 5 shows an example embodiment of the subject matter described herein illustrating improved positioning accuracy with spatially separated beams.

FIG. 5 shows an example embodiment of the subject matter described herein illustrating improved positioning accuracy with spatially separated beams. FIG. 5 illustrates an example system 500 comprising the client device 210 of FIG. 2B, the network node device 200 of FIG. 2A, two objects 510, 520 that reflect radio beams, as well as an object 530 that obstructs radio beams.

FIG. 5 illustrates the uncertainty regions derived from spatially separated beams and adjacent beams. In this scenario, when considering the case of spatially separated beams in azimuth and/or elevation domain (e.g., beams 1 and 8 or 1 and 9), the beams after reflection overlap in a narrow uncertainty region 540 where the target client device 210 is expected to be located. On the other hand, when considering the case of adjacent beams (e.g., beams 8 and 9), the beams after reflection overlap in much more extended uncertainty region, which results in degraded positioning accuracy. In case of adjacent beams, the uncertainty region may even become unbounded (in case of overlapping and parallel reflections). Here, choosing spatially separated beams leads to improved positioning accuracy due to better angular resolvability (i.e., less spatial correlation). In other words, adjacent beams are more likely to carry similar spatial information and, in addition, be affected by similar measurement errors. In this regard, observing FIG. 5, beams 3 to 6 are highly correlated in the sense that they are obstructed by the same obstacle: hence, choosing any subset of beams from this interval would not be provide useful information to compute the client device 210 position. Choosing spatially separated beams may lead to RSRP degradation: for instance, assuming that beams 8 and 9 with respect to beam 1, one can still select the latter beam and apply transmission power boosting to compensate for its poorer signal quality.

At least some of the embodiments described herein may allow increased positioning accuracy by exploiting spatial and angular domains of the propagation channel in combination with time measurements. Accordingly, at least some of the embodiments may allow client device (or UE) event-based reporting of DL TX beams upon detecting predefined criteria to be fulfilled according to given ranking method(s) for positioning. In other words, at least some of the embodiments described herein may allow a dynamic or event-based and client device-assisted indication scheme of prioritizing/ranking spatially separated beams for positioning purposes.

At least some of the embodiments described herein may allow avoiding exhaustive scanning of all beams, and instead may allow identifying multiple spatial directions according to e.g. angular separation and ToF. In this regard, two paths are easily resolvable if $|\tau_i - \tau_j| \times B \gg 1$, wherein $\tau_i$ is ToF/time delay associated with TX and RX beam pair i, and $\tau_j$ is ToF/time delay associated with TX and RX beam j. This term defines the transmission bandwidth of a transmitted signal. Hence, for a given bandwidth, resolvability may be improved by selecting spatially separated directions which may lead to better position estimation.

At least some of the embodiments described herein may allow choosing better beams for positioning since more physical layer information is used. At least some of the embodiments described herein may allow improving the performance of positioning schemes since beams with a certain angular diversity are used.

The functionality described herein can be performed, at least in part, by one or more computer program product components such as software components. According to an embodiment, the client device 200 and/or control plane network node 210 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device for wireless communication, comprising:
   at least one processor; and
   at least one memory including computer program code;
   the at least one memory and the computer program code configured to, with the at least one processor, cause the client device to at least:
     in response to a received beam ranking indication comprising at least beam specific first reference data and beam ranking criteria for positioning for downlink transmission beams between a network node device and the client device, wherein the beam ranking criteria is based on at least spatial/angular separation, ranking the downlink transmission beams based on the received beam ranking indication;
     select at least one downlink transmission beam based on the ranking;
     transmit a downlink transmission beam selection indication to the network node device indicating the selected at least one downlink transmission beam; and
     in response to a triggering event, determining a need to change beam ranking for downlink transmission beams between the network node device and the client device.

2. The client device according to claim 1, wherein the triggering event comprises identifying a new synchronization signal block/channel state information reference signal (CSI-RS) or a downlink reference signal with spatial separation above a threshold level.

3. The client device according to claim 2, wherein the threshold level comprises a threshold level for transmission of an uplink reference signal for positioning.

4. The client device according to claim 1, wherein the triggering event comprises identifying a new synchronization signal block/channel state information reference signal (CSI-RS) or a downlink reference signal based on at least one of time of flight, received reference signal power, or spatial separation.

5. The client device according to claim 1, wherein the triggering event comprises identifying a new synchronization signal block/channel state information reference signal (CSI-RS) or a downlink reference signal with at least one of time of flight, received reference signal power, or spatial separation for transmission of an uplink reference signal for positioning.

6. The client device according to claim 1, wherein the determination of the need to change beam ranking is based on at least one of: a service requirement by the client device, an identification of beams resolvable by the client device, or an indication from a network to change beam ranking.

7. The client device according to claim 1, wherein the beam specific first reference data comprises at least one of a synchronization signal block with a unique index or a positioning reference signal with a unique index.

8. The client device according to claim 1, wherein the beam ranking indication is received periodically, semi-persistently or aperiodically.

9. The client device according to claim 1, wherein the beam ranking criteria for positioning is based on at least one of: received signal information of the downlink transmission beams, angular information of the downlink transmission beams, time information of the downlink transmission beams, velocity information of movement of the client device, direction information of the movement of the client device, or a service requirement of the client device.

10. The client device according to claim 1, wherein the ranking of the downlink transmission beams comprises at least one of a hierarchic ranking or a weighted ranking.

11. The client device according to claim 1, wherein the downlink transmission beam selection indication comprises at least one of a beam index of each selected downlink transmission beam, a resource identifier or a resource set identifier associated with each selected downlink transmission beam.

12. The client device according to claim 1, wherein the downlink transmission beam selection indication comprises a transmission power boosting request for a subset of the selected downlink transmission beams.

13. The client device according to claim 12, wherein the subset of the downlink transmission beams is selected based on at least one of local information at the client device or network-provided information.

14. The client device according to claim 1, wherein the second reference data comprises at least one positioning reference signal.

15. The client device according to claim 1, wherein the at least one memory and the computer program code are further configured to, with the at least one processor, cause the client device to at least:

in response to second reference data received from the network node device with at least one downlink transmission beam according to the transmitted downlink transmission beam selection indication, estimate the signal quality of the received second reference data; and transmit a signal quality estimation indication to the network node device indicating the estimated signal quality of the received second reference data.

16. A method, comprising:

in response to a received beam ranking indication comprising at least beam specific first reference data and beam ranking criteria for positioning for downlink transmission beams between a network node device and a client device, wherein the beam ranking criteria is based on at least spatial/angular separation, ranking, by the client device, the downlink transmission beams based on the received beam ranking indication;

selecting, by the client device, at least one downlink transmission beam based on the ranking;

transmitting, by the client device, a downlink transmission beam selection indication to the network node device indicating the selected at least one downlink transmission beam;

in response to second reference data received from the network node device with at least one downlink transmission beam according to the transmitted downlink transmission beam selection indication, estimating the signal quality of the received second reference data; and transmitting a signal quality estimation indication to the network node device indicating the estimated signal quality of the received second reference data.

* * * * *